Feb. 4, 1964   O. BURCKHARDT   3,120,223
STONE SAWING MACHINES
Filed Sept. 28, 1959   2 Sheets-Sheet 2
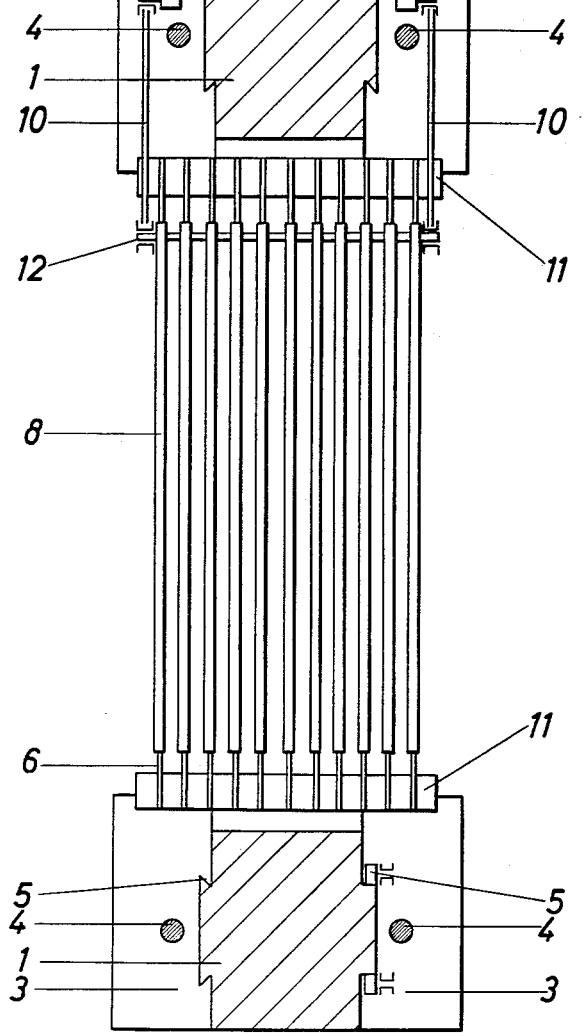
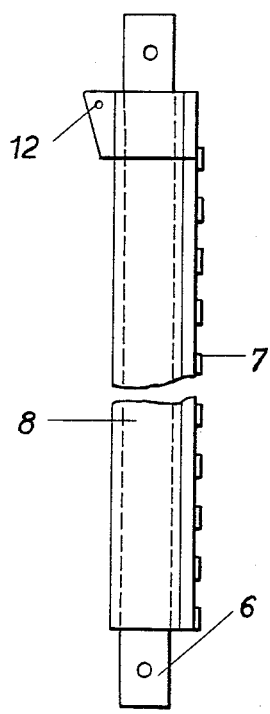
OTTO BURCKHARDT

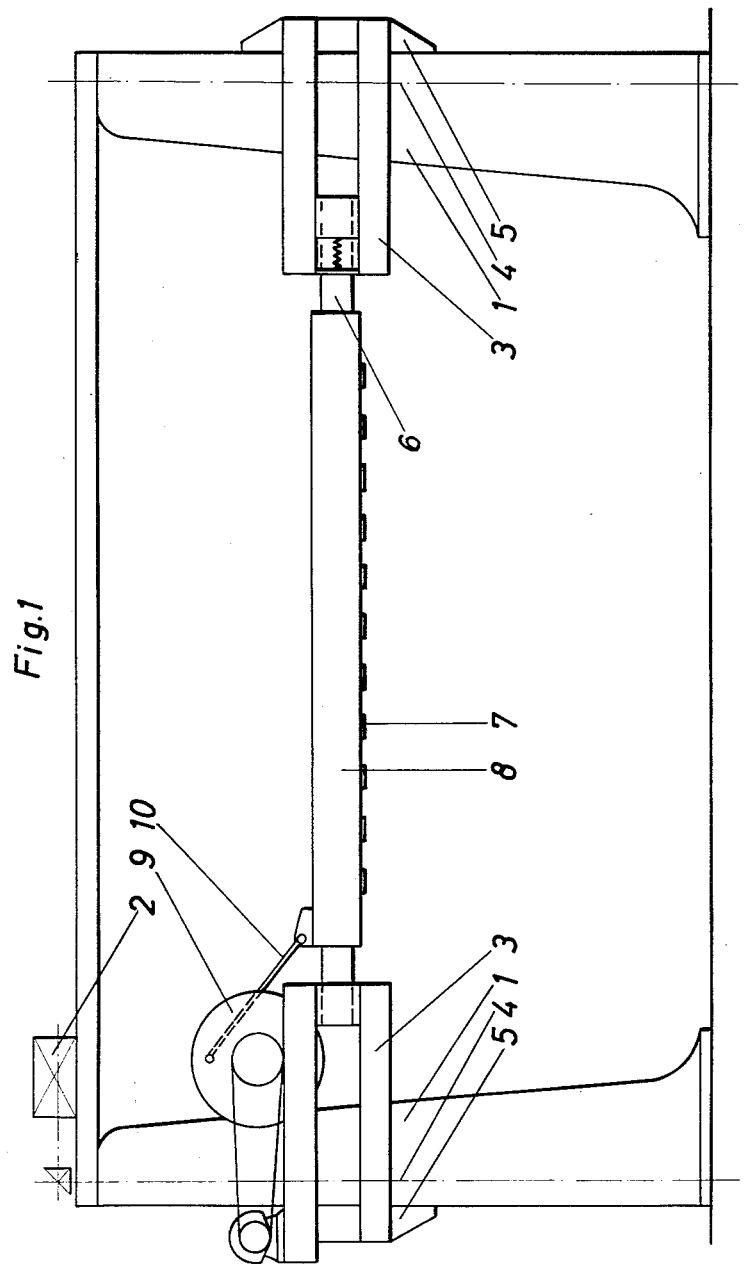

United States Patent Office 3,120,223
Patented Feb. 4, 1964

3,120,223
STONE SAWING MACHINES
Otto Burckhardt, Bayreuth, Germany, assignor to
Eisenwerk Hensel, Bayreuth, Germany, a firm
Filed Sept. 23, 1959, Ser. No. 842,858
Claims priority, application Germany Oct. 4, 1958
2 Claims. (Cl. 125—16)

The invention relates to a stone sawing machine such as used in the stone working industry for cleaving stone blocks or producing slabs, ashlars and the like.

In the known constructions of such machines (cleavage saws and gang or frame saws), the work is performed by means of saw blades which are fixed in a solid frame. This saw frame is generally reciprocated in horizontal direction by means of a crank drive on pendulums or on rollers and is lowered by spindles according to the desired rate of feed. The sawing is effected either with the aid of a loose abrasive such as quartz sand, steel sand, Carborundum or the like, or by using cutting tools set with diamonds, hardmetal or other substances.

The objection to this arrangement is that large masses have to be moved and at the same time continually accelerated and then retarded. All endeavours to increase cutting performance by increasing the speed of the saw frame are consequently confined within narrow limits.

The present invention reduces the mass of the moved parts to a fraction of that in the known machines. It is thus possible to achieve a considerable increase in the velocity of the saw blade and consequently in the cutting performance. The heaviest part which has to be moved in the former constructions, namely the saw frame, is dispensed with entirely. The separately arranged flywheel gearing, which in the known constructions occupies a considerable amount of space and necessitates considerable outlay, is also omitted. The function of the saw frame, namely the guiding of the saw blades, is performed in a perfect manner by guiding elements, for example, in the form of steel bands which are stretched between brackets forming carriages which are moved simultaneously up and down on the sawing machine uprights. The forces necessary for stretching the guiding elements no longer act on the moved saw frames but through the intermediary of the brackets or carriages on the machine uprights which can be suitably dimensioned without any difficulty. The sawing movement is derived from the reciprocating movement of the saw blades on the guiding elements. Perfect guiding of the saw blades is attained most simply by providing them on their inner side with one or more hollow spaces constructed as guide tracks and corresponding to the guiding elements. In this case the saw blade completely surrounds the guiding element or elements with the exception of the end faces, with the result that penetration of foreign bodies into the guide path is prevented. The sawing motion is effected most simply by a crank drive through the intermediary of a connecting rod. The feed is obtained by lowering the carriage with the guiding elements, whereby the saw blades sliding thereon are also lowered at the same time. For sawing, as in the known machines, either loose abrasives and/or cutting tools exchangeably fixed on the saw blade are used.

If the saw blades are set with diamonds, their durability can be increased in adaptation to the long life of the diamond tools by providing slide surfaces, on which the feed movement transmitted by the guiding elements acts, with hardened balls, rollers or exchangeable wear-resistant strips.

By a suitable arrangement of the guiding elements, vertical or inclined cuts can also be carried out in any desired direction.

Three embodiments of the invention are illustrated diagrammatically by way of example in the accompanying drawings, in which FIG. 1 shows in side elevation an embodiment constructed as a cleavage saw with one saw blade;

FIG. 2 is a top plan view of another embodiment constructed as a frame saw with 11 saw blades (three machine brackets being provided with slide guiding and one machine bracket with roller guiding), and FIG. 3 shows in side elevation the simplest design of guiding element and saw blade.

On two machine uprights or ways 1 carriages 3 are moved up and down by an infinitely variable speed transmission 2 on spindles 4, the movement of the carriages being guided either by grooved guides or by roller guide 5. Hardened and ground steel bands are stretched sufficiently taut as guiding elements 6 between the carriages. Saw blades 8 set with cutting elements or teeth are moved to and fro on guide elements by means of a crank drive 9 and connecting rod 10 and preferably completely surround the guiding elements 6.

In the case of the embodiment constructed as a frame saw, the brackets are connected by transverse bars 11 between which the guiding elements are clamped in known manner by means of wedges, eccentrics or hydraulic means. In this form of construction two crank disks 9, 9 and connecting rods 10, 10 are preferably connected with and engage the two outer saw blades. All the saw blades are provided at the top and bottom with bored lugs on their driving ends. These bores serve for receiving a rod 12 connecting the two directly driven saw blades. This connecting rod transmits the working movement to the saw blades which are not directly driven.

I claim:

1. A stone sawing machine comprising: at least two spaced, parallel carriage ways; a carriage mounted movably on each of said ways; at least one unitary, tensioned guiding element in the form of a band stretched taut by connection between said carriages to provide a straight-line guiding path between said carriages; an elongated saw blade supported along its length upon said saw-guiding element; and drive means for reciprocating said saw blade along the length of said guiding element.

2. A stone sawing machine according to claim 1 wherein said elongated saw blade comprises a tubular member completely surrounding said guiding member and having cutting elements mounted on one edge thereof.

References Cited in the file of this patent

UNITED STATES PATENTS

| 14,342 | Amezeen | Mar. 4, 1856 |
| 1,497,577 | Morzsa | June 10, 1925 |
| 2,771,872 | Bergling | Nov. 27, 1956 |
| 2,784,751 | Alexander | Mar. 12, 1957 |

FOREIGN PATENTS

| 510,105 | Belgium | Apr. 15, 1952 |
| 1,008,422 | France | May 19, 1952 |